July 21, 1931. F. J. DIETZ 1,815,549
AUTOMATIC BLOCKING DEVICE FOR CONVEYER SYSTEMS
Filed Feb. 15, 1930
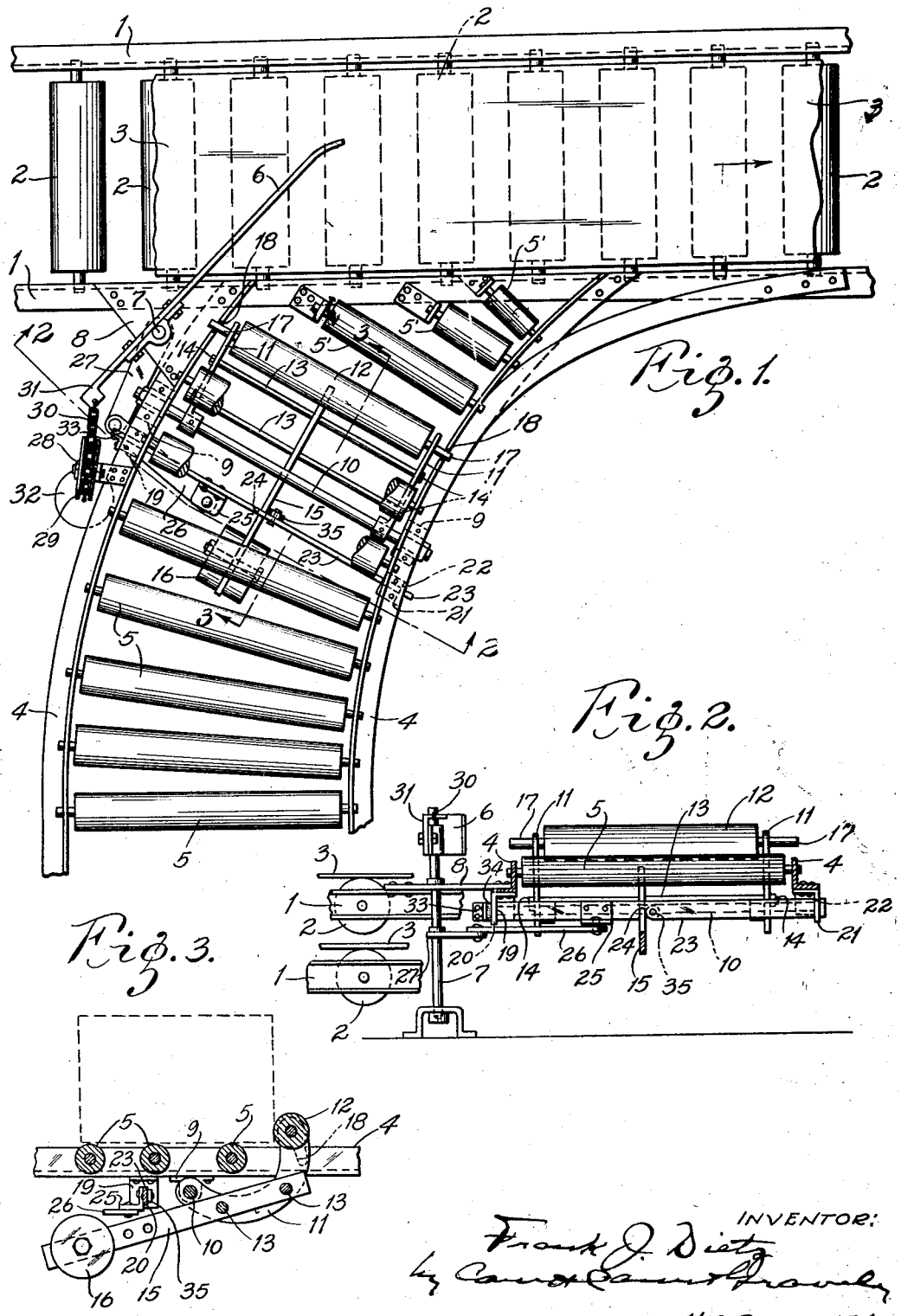

Patented July 21, 1931

1,815,549

UNITED STATES PATENT OFFICE

FRANK J. DIETZ, OF BALTIMORE, MARYLAND, ASSIGNOR TO ALVEY MANUFACTURING COMPANY, OF ST. LOUIS, MISSOURI, A CORPORATION OF MISSOURI

AUTOMATIC BLOCKING DEVICE FOR CONVEYER SYSTEMS

Application filed February 15, 1930. Serial No. 428,816.

My invention relates to improvements in conveyer systems wherein branch lines deliver articles to a main line. With systems of this type, there are likely to be frequent collisions at the points of junction of the branch lines and the main line; and the principal object of the present invention is to provide means to prevent such collisions.

The invention consists principally in providing the main line and the branch line with blocking devices that are adapted to be operated by the articles approaching the junction of two lines and themselves arranged to operate the blocking devices. The invention also consists in the parts and arrangements and combinations of parts hereinafter described and claimed.

In the accompanying drawings which form part of the specification and wherein like numerals refer to like parts wherever they occur, Fig. 1 is a portion of a conveyer system partly in section, embodying my invention adjacent to the meeting point of a main line and a branch line, Fig. 2 is a view along the line 2—2 of Fig. 1; and Fig. 3 is a view along the line 3—3 of Fig. 1.

The main line is of any suitable type. The construction illustrated in the drawings comprises side frames 1, rollers 2, rotatably mounted on said frames and an endless belt 3 supported by said rollers and actuated by a suitable source of power (not shown). The branch line is one of the ordinary gravity rollerway type, that illustrated in the drawing, comprising side frames 4, rollers 5 mounted thereon, said side frames 4 being curved to change the direction of travel of the articles so as to start them in a proper direction and in a proper position on the main line. In accordance with practice, in the angle between the main and the branch lines, rollers 5' are provided, which are preferably of different lengths as shown, and have their axis of rotation located at about 45 degrees to the line of travel of the main conveyer belt.

A blocking arm 6 is located a slight distance above the belt 3 and a short distance rearwardly from the junction of said branch line and the main line. Said blocking arm 6 is mounted on a vertically disposed rocker shaft 7 and rotatable therewith so as to be capable of swinging across the main line and engage any articles riding thereon. Said rocker shaft 7 is supported by a suitable bracket 8 mounted on the right side frame 1.

Located a short distance rearwardly from the junction of the branch line and mounted on the underneath side of each side frame and opposite each other are two brackets 9, each bracket being provided with a suitable bearing for a horizontal rocker shaft 10. Two rocker arms 11 are mounted on said shaft 10 near each end and just inside the side frames, the ends of said arms normally extending above the top surface of the bed of the rollers comprising the branch line. A roller 12 is mounted on said rocker arms so as to extend across the branch line and be in a position to block any articles riding on said branch line when said arms are in their normal position. Extending between, and through each arm are two rods 13, the end of each rod being secured to said rocker arms by the nuts 14. Secured to the center of said rods is a counterweight arm 15 extending underneath and longitudinally with the travel of the branch line, said arm being provided with a counterweight 16 adjustable thereon, so that the counterweight may be adjusted to slightly overbalance said rocker arms 11 and the roller 12. Said counterweight thereby causes the roller 12 to extend above the bed of the rollers and this is the normal position of said roller. Each end 17 of the shaft carrying said roller 12 extends far enough through said rocker arms so as to engage slots 18 provided in the side frames and constitutes a stop for the roller 12 when the latter is depressed below the surface of the main bed of rollers comprising the branch line.

Positioned directly in the rear of said bracket 9 and mounted on the left side frame 4 is an angle 19 provided with a slot 20 in its center, and secured to the right side frame opposite angle 19 is a second angle 21 provided with a similar slot 22 which is directly in line with said slot 20 and cooperates therewith to form a guide for a cross-member 23 slidable therein. Said member 23 is thereby in such a position that its lower edge is a slight distance above the counterweight arm 15 when said arm is in its normal position, and is provided with a slot 24 adapted to receive said counterweight arm when the roller 12 is depressed from its normal position and raises said counterweight arm.

Secured to the cross-member 23 is an angle 25 with a crank arm 26 secured thereto, the other end of said crank arm being secured to a rocker arm 27 that is mounted on the rocker shaft 7 whereby lateral movement of said cross-member is transmitted to the blocking arm 6. Mounted on a bracket 28 secured to the left side frame 4 a slight distance rearwardly of the angle 19 is a pulley 29 that carries a chain 30; one end of said chain being secured to an arm 31 extending from said blocking arm 6, the other end of said chain carrying a weight 32 which holds said arm 6 in its normal position as shown in the drawings. Secured to said cross-member 23 is a second angle 33 provided with a piece of thick rubber 34 or like material, that abuts the angle 19 and serves as a buffer or shock absorber when said cross-member 23 is returned to its normal position by the weight 32. Preferably a roller 35 is mounted on the right hand side of slot 24 to guide the counterweight arm 15 into the slot and hence promote better operation of the two.

The operation of the system hereinbefore described is as follows:

The roller 12, together with the rocker arms and the counterweight arm 15 are all adjusted in relation to the counterweight so that the stop roller will normally be in a blocking position. Any article riding against the stop roller will tend to depress said roller and when so depressed the counterweight arm 15 engages the slot 24 on the cross-member 23, and this prevents any lateral motion of said cross-member 23 until the stop roller 12 is returned to its blocking position.

As long as the counterweight arm is engaging the slot of the crosswise member the latter is locked and the parts connected therewith are also locked. As soon as the article has passed over the stop roller the latter rises and this in turn unlocks said cross-member. As there is no longer any resistance to the lateral movement of the cross-member, and its connecting parts are all free to move, the blocking arm is free to swing around permitting any article riding on the main line to pass onto the junction. However, when the blocking arm 6 swings around, it moves the slot 24 from its normal position, and hence prevents any articles riding on the branch line from depressing said stop roller. After any article riding on the main line passes said blocking arm 6 the cross-member 23 is returned to its normal position by the weight 32 which is attached to the chain 30 and this action again unlocks the stop roller.

From the foregoing description of my system and its operation, it is obvious that the blocking devices of the branch line (or lines) and of the main line should be located a short distance rearwardly from the point or points of junction, the proper distance being readily ascertainable by reference to the time of travel of the articles on the main and branch lines from the respective blocking devices to the point or points of junction.

Obviously, the construction hereinbefore described admits of considerable variation without departing from my invention. While I have described the device embodying my invention in conjunction with a main power line and a branch gravity line, it could be used in connection with two joining gravity lines or two joining power lines, by interposing a gravity line between one of the power lines and the point of junction with the other power line; and obviously, it could also be used in connection with two branch or with two main lines.

What I claim is:

1. A conveyer system comprising a plurality of lines and interconnected mechanical means operable by articles on said lines for blocking the movement of articles on either of said lines by an article on the other line.

2. A conveyer system comprising a main line and a branch line, and interconnected mechanical means operable by articles on the main and branch lines for blocking the movement of articles on either of said lines by an article on the other line.

3. A conveyer system comprising a main line and a source of power therefor, a branch gravity conveyer, and interconnected mechanical means operable by articles on the main and branch lines for blocking the movement of articles on either of said lines by an article on the other line.

4. A conveyer system comprising a main line, a branch line, an arm operatively connected with reference to the main line to be actuated by an article thereon, and a roller operatively located with reference to the branch line to be actuated by an article thereon, said arm and said roller being operatively connected, to control the movement of articles on either of said lines by an article on the other line.

5. A conveyer system comprising a main line, a branch line, an arm operatively located with reference to the main line to be actuated by articles thereon, a roller operatively located with reference to the branch line and operatively connected with said arm, and means for locking either said arm or said roller when an article engages the said roller or arm respectively.

6. A conveyer system comprising a main line, a branch line, a bracket secured to said main line, a vertically disposed shaft supported by said bracket, an arm clamped to said shaft, said arm being located with reference to the main line to block an article thereon and operatively connected to a member underneath and crosswise the branch line, a slot in said crosswise member, a roller mounted on rocker arms and located with reference to the branch line to be actuated by an article thereon, a member secured to said rocker arms and placed longitudinally the branch line and in position to engage said slot in said crosswise member when an article on the branch line has depressed said roller and is traveling over said roller.

7. A conveyer system comprising a main line, a branch line, an arm located with reference to the main line to be actuated by an article thereon, a rocker shaft placed crosswise underneath said branch line, two rocker arms extending from said shaft, a roller mounted on said rocker arms, a member secured to said rocker arms, a counterweight secured to said member and placed in position to slightly overbalance said roller and said rocker arms so as to normally hold said roller in position to be engaged by an article traveling on said branch line, a member mounted crosswise above said counterweight arm and operatively connected to said blocking arm on the main line.

8. A conveyer system comprising a main line, a branch line, a roller located with reference to the branch line to be actuated by an article thereon, an arm extending partly across and with reference to the main line to be actuated by an article thereon and operatively connected to said roller, a chain secured to said arm and running over a pulley mounted on said branch line and a weight secured to said chain so as to swing said arm back to its normal position after said arm ceases to engage an article traveling on said main line.

Signed at Chicago, Ill., this 11th day of February, 1930.

FRANK J. DIETZ.